United States Patent [19]

Carroll et al.

[11] 3,825,721

[45] July 23, 1974

[54] ELECTRODE FOR VERTICAL-UP OPEN ARC WELDING USING MOLDING SHOES

[75] Inventors: John E. Carroll, Chagrin Falls; Carl E. Stump, Euclid, both of Ohio

[73] Assignee: The Lincoln Electric Company, Cleveland, Ohio

[22] Filed: Jan. 4, 1973

[21] Appl. No.: 317,352

Related U.S. Application Data

[63] Continuation-in-part of Ser. No. 216,233, Jan. 7, 1972, abandoned.

[52] U.S. Cl................. 219/146, 219/74, 219/137
[51] Int. Cl............................................ B23k 35/22
[58] Field of Search ............ 219/73, 74, 137, 146; 117/202–207

[56] References Cited
UNITED STATES PATENTS

| | | | |
|---|---|---|---|
| 2,909,650 | 10/1959 | Landis et al. | 219/146 |
| 3,177,340 | 4/1965 | Danhien | 219/146 |
| 3,318,729 | 5/1967 | Siegle et al. | 219/146 |
| 3,461,270 | 8/1969 | Patton | 219/146 |

*Primary Examiner*—J. V. Truhe
*Assistant Examiner*—C. Shaw
*Attorney, Agent, or Firm*—Meyer Tilberry & Body

[57] ABSTRACT

A cored-type welding electrode for vertical-up welding using molding shoes to hold the molten metal in position, using an open arc which does not require an externally-supplied shielding gas and which permits very high linear welding speeds. The core materials include a metal fluosilicate capable of breaking down in the heat of the arc to produce: a gas in sufficient volume to shield the arc from the atmosphere and a slag forming ingredient; and, other slag forming ingredients including the metal oxides and the alkali metal fluorides in a critical volume such that the total slag forming ingredients do not exceed six percent of the total electrode weight and the oxides are present in quantities at least greater than the fluorides. The self-shielded electrode further permits the use of active deoxidizers in quantities of under 0.5 percent.

9 Claims, No Drawings

ELECTRODE FOR VERTICAL-UP OPEN ARC WELDING USING MOLDING SHOES

This application is a continuation-in-part application of U.S. Ser. No. 216,233, filed Jan. 7, 1972 now abandoned.

The present invention relates to the art of vertical-up welding using molding shoes and more particularly to an electrode having associated therewith metallic and non-metallic ingredients enabling open-arc welding without the need of externally-supplied gases.

The invention is particularly applicable to a cored-type electrode wherein the gas and slag forming, deoxidizing and/or alloying ingredients are on the inside and will be described with particular reference thereto although it will be appreciated that the various ingredients could in some instances be applied to the external surface of the electrode.

It is conventional today to weld steel plates together by positioning them vertically with their edges in spaced-parallel relationship, bridging the gap by means of molding shoes to form an upwardly-opening well and depositing weld metal in the well so formed. The molding shoes generally in the form of copper dams are either long enough to cover the entire joint or are caused to slide upwardly along the joint as the weld metal is deposited and solidifies. These processes are known either as electro slag or electro gas welding.

In the electro slag process a slagging material and electrically-energized electrode are fed continuously into a molten pool of slag held in the well by the edges of the workpiece and the two dams. The conduction of the current through the slag heats the slag and causes the electrode end to melt off and fuse with the workpiece. There is no arc involved in this welding process.

In the electro-gas process, an electrically-energized electrode is continuously fed toward the molten pool while maintaining an open arc between the end of the electrode and the molten pool of metal. The arc is then shielded by externally-supplied carbon dioxide gas or a mixture of argon and carbon dioxide. The arc melts off the electrode end and the molten metal fuses with the edges of the workpiece.

Both of these processes have a relatively slow linear welding speed on the order of 1½ to 2 inches per minute and require so much heat per inch of weld that special cooling techniques must be employed or special alloying ingredients must be employed to attain the proper physical specifications of yield and impact strength.

The present invention contemplates an electrode for such vertical-up welding which requires neither the independent addition of a slagging material nor an externally supplied gas. Furthermore, the electrode enables welding at linear speeds never before thought possible, and with such a low heat input per inch of weld that special cooling techniques or special alloying of the weld metal are not required to obtain the required physical strength.

Flux-cored welding electrodes such as that described in U.S. Pat. No. 2,909,778 and assigned to the assignee of this application are capable of welding open seams without the use of an externally supplied flux or shielding gas. However, these prior art electrodes cannot be used in the vertical-up process because they are designed to produce a large volume of slag which is required to protect the weld bead in open-seam welding. Thus, when they are used, the large weight of electrode required per inch of vertical weld produces a slag volume greater than can be accomodated in the well created by the edges of the plate and the two dams. The slag accumulates in this well and ultimately snuffs out the arc and interrupts the weld. Further, such prior art electrode when welding open seams required the use of substantial amounts of highly reactive killing agents or deoxidizers such as aluminum and titanium or boron. These metals are considered undesirable in large amounts in vertical-up welding primarily because they tend to adversely effect the physical strengths of the deposited weld bead and result in a weld bead which will not meet the specifications of the Americal Welding Society.

Thus, the electrode contemplated by the present invention has 1) a critical maximum volume of slagging ingredients which will remain on the weld pool, 2) a critical relationship of metal oxides to fluorides, 3) sufficient self shielding as to require no active deoxidizers, and 4) an alloying system compatible with the steel which is being welded to produce the high physicals required.

In accordance with the present invention, an electrode for open-arc vertical-up welding without the use of an externally-supplied shielding gas is provided comprised of an elongated steel tube having as a core material: slag forming ingredients consisting of the metal oxides and an alkaline earth metal or alkali metal fluosilicate capable of breaking down in the heat of the arc to produce silicon tetrafluoride, a gas, and a fluoride, a slag-forming ingredient. Additionally, the alkali metal or alkaline earth metal fluorides may be employed as a further slag-forming ingredient in such proportions that the freezing temperature of the slag is below the freezing temperature of steel.

The total weight of the non-metallic ingredients which can contribute to the slag volume are between 1.5 to 6.0 percent of the total electrode weight and the weight of the oxides is always at least in excess of the fluorides. As a preferred range, the weight of the non-metallics which can contribute to the slag volume is between 2.5 percent and 3.5 percent of the total electrode weight. These percentages, of course, assume that the metal fluosilicate is 100 percent broken down or decomposed.

The known metal fluosilicates are the fluosilicates of the: alkali metals; the alkaline earth metals; lead; manganese; cadmium; iron; cobalt; and, nickel. Of these, only sodium fluosilicate, potassium fluosilicate, rubidium fluosilicate, cesium fluosilicate, calcium fluosilicate, and barium fluosilicate are preferred. The other fluosilicates, although they would probably work, tend to occur in the hydrated state and either must be dehydrated before use or elaborate welding procedures used to accomodate the excessive water.

Of the preferred fluosilicates, sodium fluosilicate ($Na_2SiF_6$) and potassium fluosilicate ($K_2SiF_6$) are readily available and have an economic advantage over the others.

To avoid misunderstanding of the materials described, fluosilicates and silico-fluorides are the same compounds. For example, $Na_2SiF_6$ is referred to as sodium fluosilicate and as sodium silico-fluoride. ($SiF_6$) is the fluosilicate radical and has a valence of two accounting for the fluosilicate nomenclature. However, if the same compound is viewed as being a complex 2(NaF)·SiF$_4$ it would probably be more aptly named sodium silico-fluoride.

These fluosilicates break down in the heat of the arc to produce silicon tetrafluoride, a gas at room temperature, and a metal fluoride which is a liquid at or just slightly below the melting temperature of steel and can protect the surface of the molten steel from the atmosphere. Also, the fluorides mix with the other slag forming ingredients which mixture flows into the space between the hardening weld metal and the molding shoes and help to shape the weld bead surface.

It will be appreciated that the arc in vertical-up welding is in a pocket or well which in effect mechanically shields the arc from the atmosphere and the evolving gases are more able to exclude the atmosphere from the arc than would be the case in open-seam welding. Further, the gases evolve at the point of arcing and the flow of gas is always away from the arc and up and out of the well so that purging of any oxygen or nitrogen from the vicinity of the weld pool and arc is almost 100 percent complete. Further, the slagging materials coat and protect the metal droplets as they transfer across the arc to the weld pool. In these respects the mode of operation may be distinguished from gas shielded welding where the gas can possibly aspirate the oxygen and nitrogen from the air into the well.

A further requirement of the core ingredients is that the slag remaining after the gas has been evolved have a solidification temperature less than the solidification temperature of the molten steel, so that as the steel solidifies particularly adjacent to the corners of the steel plate and adjacent the shoes which are usually cooled, the flux will remain molten and will not adversely effect the shape of the surface of the congealing weld metal.

Further in accordance with the invention, the core ingredients include controlled amounts of conventional slagforming ingredients, such as without limitation: the oxides of iron, manganese, zirconium, silicon, titanium, aluminum and the like. These oxides may be added as independent compounds or as an impurity in iron powder which is used as a bulking agent.

Additionally, alkali metal or alkaline earth metal fluorides can be used to supplement the fluoride evolved from the breaking down of the fluosilicate.

The proper selection and proportioning selection selection of these oxides and fluorides is necessary to produce a sufficiently high slag viscosity that the slag is not pushed aside by the arc force to expose the surface of the molten metal to any atmosphere which may not have been excluded from the well. To provide this viscosity the oxides are present in at least greater quantities than the fluorides.

The exact oxides or fluorides employed is not as important as the ultimate slag viscosity.

In the preferred electrode, silicon dioxide, iron oxide and sodium fluoride are the principal slag forming ingredients.

In vertical-up welding, a substantial amount of welding electrode is consumed e.g., 1.30 pounds per foot of weld for ⅝ inch plate and 1.99 pounds per foot for one inch plate. It is important that the amount of slagging materials in the electrode core be limited so that the well will not fill up with molten slag and short out the arc which would change the welding process from open arc to electro slag, and result in non-acceptable welds.

Thus, importantly the weight of slag forming ingredients is between 1.5 and 6.0 percent, and preferably between 2.5 and 4.5 percent.

Because of the excellent protection to the weld pool offered by the above-mentioned ingredients, there is no need to use active deoxidizers such as silicon, titanimum, aluminum, zirconium, magnesium or calcium for the purpose of killing the molten weld pool to prevent porosity. Any use of these elements is only required to match the chemical analysis of the steel to be welded and in any case should never exceed 0.5 percent. Manganese is considered as an alloying agent and not as an active deoxidizer.

The steels being commonly welded by the vertical-up welding process normally contain manganese in significant quantities and silicon, carbon, vanadium, molybdenum, nickel, chromium, titanium or other alloying metals in minor quantities so as to alter the physical properties of the workpieces for a particular application. Thus, the core material always include manganese. Any of these latter-mentioned metals or carbon can be added to the core ingredients or included in the steel shell in minor amounts as needed for alloying purposes only. Because of the configuration of the welding system and the gas and slag producing ingredients of the core, no active deoxidizers are required. Almost 100 percent of these metals show up in the weld bead.

Such steels commonly have the following chemical analysis:

|  | A36 | A441 | A537 |
| --- | --- | --- | --- |
| C | .25 | .22 | .20 |
| Mn | .80–1.2 | .85–1.25 | .70–1.35 |
| P(Max.) | .04 | .04 | .035 |
| S(Max.) | .05 | .05 | .04 |
| Si | .15–.30 | .30(Max.) | .15–.50 |
| Cr | 0 | 0 | .25 |
| Ni | 0 | 0 | .25 |
| Mo | 0 | 0 | .08 |
| Cu(Min.) | .20 | .20 | .35 |
| Other | 0 | .02V | 0 |

The gas-forming, slagging and alloying ingredients above referred to are preferably used as the core material of a hollow, tubular or cored electrode, although if they can be placed on the surface of the electrode, e.g. using grooves, in a manner such that electric current can still be fed to the electrode such an electrode would be within the scope of the present invention.

Because vertical-up welding takes place in a well from which oxygen and nitrogen can be more readily excluded than in open-seam welding, it is unnecessary to use the aluminum, titanium or boron specified in U.S. Pat. No. 2,909,778 as a killing agent to prevent porosity.

The preferred embodiment of the invention consists of an outer shell of low-carbon steel e.g., .05 percent to .10 percent carbon, and an inner core of compacted finely-divided particles of the various compounds necessary in accordance with the invention to enable vertical-up welding to be accomplished with an open arc and without the need of an externally-supplied shielding gas.

Broadly, the composition of the ingredients are as follows; expressed in percentage of the total weight of the electrode:

| | |
|---|---|
| Metal fluosilicate | 1.00 – 2.0 |
| Alkali metal fluorides | 0.00 – 2.0 |
| Metal oxides | 0.75 – 5.5 |
| Manganese | 0.25 – 3.0 |
| Chromium, nickel, titanium, silicon, molybdenum, vanadium, zirconium, aluminum, carbon | as needed to match chemistry of workpiece |
| Steel electrode and iron powder | balance |

More specifically, a general electrode preferred composition range is as follows:

| | |
|---|---|
| Quartz (SiO$_2$) | 0 – 1.5 |
| Potassium or Sodium fluosilicate | 1.0 – 2.0 |
| Sodium Fluoride | 0 – 0.75 |
| Iron Powder (at least 95% Fe) | 10 – 20 |
| Manganese (100% Mn) | 1.0 – 3.0 |
| Titanium, silicon, zirconium, nickel, chromium, vanadium, molybdenum | as required |
| Steel Shell (.05 – .10C) | balance |

A more specific formula and one preferred for structural steels is as follows:

| | |
|---|---|
| Quartz (SiO$_2$) | 1.0 |
| Potassium fluosilicate | 1.5 |
| Sodium fluoride | 0.6 |
| Iron Powder (95% Fe Bal. oxides) | 19.4 |
| Ferro silicon (50% Fe – 50% Si) | 0.5 |
| Manganese metal | 2.5 |
| Steel outer shell | balance |

In all instances when making a cored electrode, iron powder is included in the formulation and primarily serves as a bulking agent to enable the small amount of fluxing ingredients and alloying ingredients to be tightly compacted in a cored electrode. In the absence of the iron powder it would be difficult to make the cross-sectional area of the core small enough to tightly compact the particles. The steel of the shell normally contains the required amount of carbon and no additional carbon is normally required.

IN welding using the electrode of the present invention, the edges of the plates to be welded are positioned in vertically-extending parallel relationship, spaced to provide a minimum usable opening of approximately one-half inch. Movable copper dams are placed on each side of the plates so as to bridge the gap. These copper dams are arranged to move upwardly as the weld progresses. A welding nozzle is mounted so as to move upwardly with the copper dams and so that the electrode will, at the point of the arc intersect approximately the center of the gap.

A relationship between the electrode diameter electrical stickout, welding current, and welding voltage must be maintained to produce a weld in which the energy input is approximately 300,000 to 550,000 Joules per inch of weld per inch of plate to achieve weld metal deposit having the desired physical properties.

The condition stated is achieved as follows: First, the well provided between the dams and the edges of the plate has the minimum cross-sectional area which will allow mechanical access to the well and still provide clearance around the electrode to prevent the arc from freely running up and down the electrode between the electrode and the wall of the well.

Second, a voltage is chosen so that an arc large enough to cause the weld metal to wet to the corners of the plate is established.

Third, a current and electrical stickout is chosen so that the deposition rate of weld metal will cause the weld to advance vertically at a rate that will result in an energy input of approximately 300,000 to 550,000 Joules per inch of weld per inch of plate.

When applying these conditions to the welding electrode described, a .120 inch diameter electrode having a stickout of 3 inches welding 1 inch thick plates spaced one-half inch at 800 amperes and 45–47 volts results in a weld speed of 6.5 – 7.5 inches per minute and an energy input of approximately 300,000 Joules per inch of weld per inch of plate thickness. A five thirty-seconds inch diameter electrode would require a higher current and a longer stickout to meet the energy input requirement.

As the welding proceeds the metal fluosilicate breaks down in the heat of the arc to produce, at the arc itself, silicon tetrafluoride, a gas which purges the air from the well formed by the movable dams and the edges of the plate so that nitrogen is excluded from the vicinity of the molten weld metal. The metal fluoride remaining, together with the other non metallics, are liquid at the solidification temperature of steel and serve to protect the metal droplets as they transfer across the arc and the surface of the molten weld pool from the atmosphere while at the same time flowing outwardly between the copper dams and the solidifying molten weld metal where they solidify, most of it, after the weld metal itself solidifies. The non-metallic slag-forming materials in the electrode continuously replenish the slag on top of the molten weld pool, but never to an extent such that the slag depth increases to the point where the end of the electrode becomes buried therein which would short out the arc and result in poor fusion and wet in at the edges of the plate. Thus, it is important that at all times the electrode be used with an open arc. It is to be noted, however, that in some instances if the depth of slag on the weld pool tends to excessively increase, the gases evolving at the arc do so with sufficient volume and force to eject some of the excess slag from the well thus tending to keep the slag depth always within proper amounts.

It is further to be noted that the electrode feed speed and the linear rate of welding and voltage are all so adjusted that the end of the electrode nozzle is spaced an abnormally long distance from the surface of the weld pool resulting in the electrode having what is referred to as a long electrical stickout. The high current density in this stickout portion of the electrode heats the electrode by I$^2$R heating so that each portion of the advancing electrode just before it reaches the arcing end of the electrode will be substantially heated. The arc then needs to supply only enough heat to raise the electrode end the remainder of the way to the melting temperature and then to supply the heat of fusion. Thus, a very high electrode melt-off rate is obtained for a given arc current. In this way, the total heat input to the weld per inch of plate thickness per inch of linear weld is held to the value of 300,000 to 550,000 Joules per inch of plate thickness per inch of weld. The use of a long stickout and high-current density to increase the melt-off rate is described in U.S. Pat. No. 2,721,249 assigned to the assignee of this application.

It will, of course, be appreciated that as the plate thickness increases above 1¼ inches for example up to 3 inches, it may be desirable to oscillate the electrode in a plane parallel to the edges of the plates, so as to obtain even heat supply across the entire width of the plate to insure that the corners of the edges will be fused with the molten weld pool. Also, more than one electrode can be used.

The exact method and apparatus for using the electrode of the present invention will be described and claimed in a companion application.

Having thus described our invention, we claim:

1. A cored type welding electrode for use in a vertical-up welding process on structural low alloy steels which process comprises: positioning the edges to be welded in spaced vertically-extending relationship; bridging the space by copper dams to form an upwardly facing well; and continuously feeding an electrode into the well while maintaining an electric arc between the end of the electrode and a molten weld pool while refraining from supplying any externally-supplied shielding gases, the electrode consisting of a low carbon steel shell having on the inside welding ingredients consisting of: iron powder, manganese, 0–2 percent of an alkali or an alkaline earth metal fluoride(s), a fluosilicate capable of breaking down in the heat of the arc to evolve a gas and a metal fluoride, one or more metal oxide(s), and alloying elements selected from the class consisting of silicon, carbon, vanadium, molybdenum, nickel, chromium, titanium and zirconium, the total amount of silicon, titanium and zirconium, if present, being less than 0.5 percent of the total electrode weight, the metal fluorides and metal oxides being slag-forming ingredients and the total weight thereof being between 1.5 and 6 percent of the total electrode weight, the fluosilicates being present in amounts of at least 1 percent of the total electrode weight whereby the amount of gas evolved and slag forming ingredients are such that there is no need for an externally supplied shielding gas.

2. The electrode of claim 1 wherein said fluosilicate is selected from the class consisting of potassium or sodium fluosilicate.

3. The electrode of claim 1 wherein the metal fluorides and metal oxides are approximately 2.5 to 4.5 percent of the total electrode weight.

4. The arc welding electrode of claim 1 wherein the ingredients on the inside thereof in weight percent of total electrode are as follows:

| | |
|---|---|
| Silicon dioxide | 0 – 1.5 |
| Sodium fluoride | 0 – .75 |
| Iron powder (at least 95% Fe balance oxides) | 10 – 20 |
| Manganese | 1.0 – 3.0 |
| Metal fluosilicate | 1.0 – 2.0 |
| Steel Shell | balance |

5. The electrode of claim 4 wherein the ingredients in weight percent of the total electrode are as follows:

| | |
|---|---|
| Silicon Dioxide | 1.0 |
| Potassium Fluosilicate | 1.5 |
| Sodium Fluoride | 0.6 |
| Ferrosilicon (50% Fe – 50% Si) | 0.5 |
| Manganese Metal | 2.5 |
| Iron Powder (at least 95% Fe) [&] | 10–20 |
| Steel Outer Shell[)] | BALANCE |

6. The arc welding electrode of claim 1 wherein the ingredients on the inside thereof in weight percent of total electrode are as follows:

| | |
|---|---|
| Metal Fluosilicate | 1.0 – 2.0 |
| Alkali & Alkaline earth Metal Fluorides | – 2.0 |
| Metal Oxides | 0.75 – 5.5 |
| Manganese | 0.25 – 3.0 |
| Chromium, Nickel, Titanium, Silicon, Molybdenum, Vanadium, Zirconium, Aluminum, Carbon | ALL AS NEEDED TO MATCH CHEMISTRY OF WORKPIECE |
| Iron Powder | 10 – 20 |
| Steel [Electrode &] Shell [Iron Powder] | BALANCE |

7. The electrode of claim 1 wherein the amount of said alloying elements selected are not in excess of the corresponding alloying elements in the structural low alloy steel being welded.

8. In a method of vertical-up welding structural low alloy steels without the use of an externally supplied shielding gas, wherein the edges to be welded are positioned in spaced vertically-extending relationship; the space is bridged by copper dams to form an upwardly facing well; and an electrode is continuously fed into the well while maintaining an electric arc between the end of the electrode and a molten weld pool, the improvement which comprises: refraining from supplying an externally supplied shielding gas and the electrode consisting of a low carbon steel shell having on the inside welding ingredients consisting of: iron powder, manganese, 0–2 percent of an alkali or alkaline earth metal fluoride(s), a metal fluosilicate(s) capable of breaking down in the heat of the arc to evolve a gas and a metal fluoride, one or more metal oxide(s), and alloying elements selected from the class consisting of silicon, carbon, vanadium, molybdenum, nickel, chromium, titanium and zirconium, the total amount of silicon, titanium and zirconium, if present, being less than 0.5 percent of the total electrode weight, the metal fluorides and the metal oxides being slag forming ingredients and the total weight thereof being between 1.5 and 6 percent of the total electrode weight, the amount of fluosilicate being at least in excess of 1 percent of the total electrode weight whereby the amount of gas evolved and slag forming ingredients are such that no externally supplied gas is needed.

9. The method of claim 8 wherein the amount of said alloying elements selected are not in excess of the corresponding alloying elements in the structural low alloy steel being welded.

* * * * *